US012770452B2

(12) United States Patent
Van Hyfte et al.

(10) Patent No.: US 12,770,452 B2
(45) Date of Patent: Oct. 20, 2026

(54) GAS DETECTOR FOR A STORAGE DEVICE WITH MULTIPLE COMPARTMENTS

(71) Applicant: MOBILE LOCKER NV, Antwerp (BE)

(72) Inventors: Jef Van Hyfte, Brasschaat (BE); Koen Mortelmans, Zandhoven (BE)

(73) Assignee: MOBILE LOCKER NV, Antwerp (BE)

( * ) Notice: Subject to any disclaimer, the term of this patent is extended or adjusted under 35 U.S.C. 154(b) by 373 days.

(21) Appl. No.: 18/036,486

(22) PCT Filed: Nov. 13, 2021

(86) PCT No.: PCT/EP2021/081608
§ 371 (c)(1),
(2) Date: May 11, 2023

(87) PCT Pub. No.: WO2022/106324
PCT Pub. Date: May 27, 2022

(65) Prior Publication Data

US 2024/0013607 A1 Jan. 11, 2024

(30) Foreign Application Priority Data

Nov. 17, 2020 (EP) .................................... 20208045

(51) Int. Cl.
*G07F 9/02* (2006.01)
*E05G 1/08* (2006.01)
(Continued)

(52) U.S. Cl.
CPC ............... *G07F 9/026* (2013.01); *E05G 1/08* (2013.01); *E05G 1/10* (2013.01); *G07F 17/12* (2013.01)

(58) Field of Classification Search
CPC . G07F 9/026; G07F 17/12; E05G 1/08; E05G 1/10
See application file for complete search history.

(56) References Cited

U.S. PATENT DOCUMENTS 5,141,532 A * 8/1992 Sacks .................... G01N 30/40 95/87
7,992,424 B1 * 8/2011 Grossenbacher ...... G01N 30/24 73/23.41
(Continued)

FOREIGN PATENT DOCUMENTS

DE 19961877 A1 9/2000
EP 2758772 B1 10/2018

OTHER PUBLICATIONS

Gruznov et al., "Determination of Explosive Vapor Concentrations with Remote Sampling in the Control of Objects", Journal of Analytical Chemistry, vol. 72, No. 11, Nov. 3, 2017, pp. 1155-1160.
(Continued)

*Primary Examiner* — Stephen D Meier
*Assistant Examiner* — Quang X Nguyen
(74) *Attorney, Agent, or Firm* — Workman Nydegger

(57) ABSTRACT

A storage device includes a plurality of compartments. The storage device has a substance detection system configured for detecting the presence of one or more tracer substances in one or more of the plurality of compartments. The substance detection system includes a gas detector configured for detecting a presence of the one or more tracer substances within a volume of air, an air sampling system configured for sequentially sampling and transporting air from each of the compartments to the gas detector, and a control system coupled to the gas detector. The control system is configured for: i) receiving a detection signal from the gas detector, ii) signaling a presence of a first tracer substance in one of the plurality of compartments and iii)
(Continued)

Figure 1:
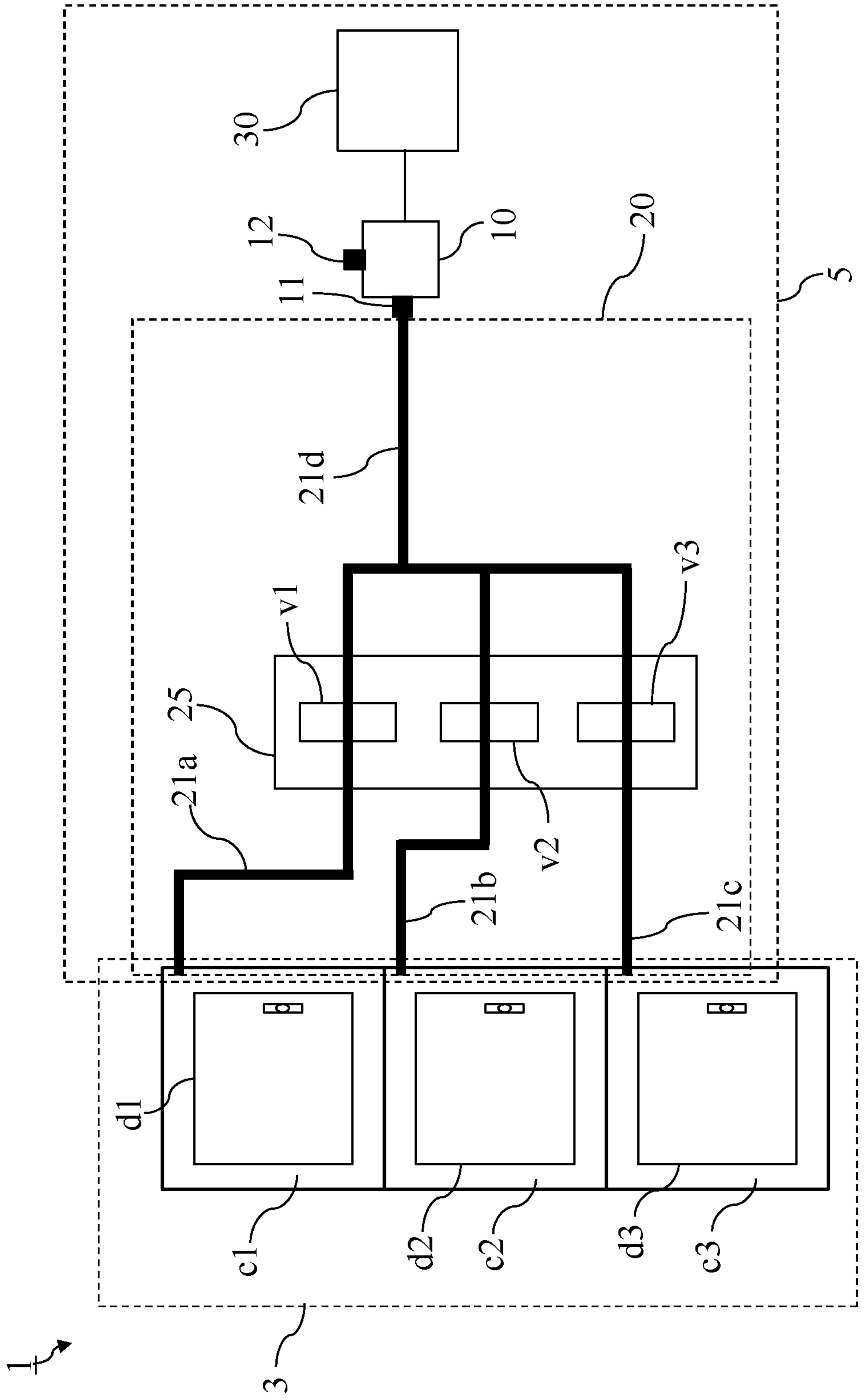

identifying in what compartment of the plurality of compartments the first tracer substance is detected.

17 Claims, 7 Drawing Sheets

(51) Int. Cl.

| | |
|---|---|
| ***E05G 1/10*** | (2006.01) |
| ***G07F 17/12*** | (2006.01) |

(56) References Cited

U.S. PATENT DOCUMENTS

| | | | | |
|---|---|---|---|---|
| 2008/0017105 | A1* | 1/2008 | Moriya | B01J 4/008 118/708 |
| 2009/0211436 | A1* | 8/2009 | Rubey | G01N 30/6073 96/102 |
| 2012/0272712 | A1 | 11/2012 | Fine et al. | |
| 2013/0137183 | A1 | 5/2013 | Nacson | |
| 2014/0235493 | A1* | 8/2014 | Zang | G01N 33/0031 506/9 |
| 2015/0268139 | A1* | 9/2015 | Calio, Jr. | G08B 21/182 73/863.03 |

OTHER PUBLICATIONS

Extended European Search Report from corresponding European Patent Application No. EP20208045.3, May 11, 2021.

International Search Report from corresponding PCT Application No. PCT/EP2021/081608, Feb. 25, 2022.

* cited by examiner

GAS DETECTOR FOR A STORAGE DEVICE WITH MULTIPLE COMPARTMENTS

FIELD OF THE DISCLOSURE

The present disclosure relates to a storage device comprising a compartment assembly having a plurality of compartments and wherein each of the plurality of compartments has an access door for placing one or more objects in the compartment.

BACKGROUND

An example of a storage device comprising a compartment assembly is for example a locker device having multiple locker compartments, also named safes. A further example of a storage device comprising a compartment assembly is a garbage bin device having a plurality of garbage compartments.

Locker devices are used at a variety of locations, which can be public, semi-public or private locations. Examples of such locations are railway stations, airports, amusement and festival parks, concert halls and sport arenas.

The locker device allows individual persons for safely store and/or exchange one or more objects such as personal belongings or other objects during a given period of time.

However, one of the problems with present locker devices is that at some locations, generally public spaces where many people can be present, locker devices are no longer allowed to be installed for reasons of a potential criminal threat. Indeed, the compartments of the locker device might be used to store dangerous or forbidden goods such as for example explosives or narcotics.

Hence, there is a need for improving locker devices, especially for reducing the fear of potential criminal threats involving locker devices.

The need to improve storage devices is not limited to locker devices but is required for all devices comprising multiple compartments where individuals can insert goods. For all these storage devices having multiple compartments, a potential criminal threat exist that those compartments comprise for example explosives.

SUMMARY

It is an object of the present disclosure to provide a robust and reliable storage device that reduces the risk of potential criminal acts.

The present invention is defined in the appended independent claims. The dependent claims define advantageous embodiments.

According to an aspect of the present disclosure, a storage device is provided comprising a compartment assembly having a plurality of compartments and wherein each of the plurality of compartments has an access door for placing one or more objects in the compartment. The storage device further comprises a substance detection system configured for detecting a presence of one or more tracer substances in one or more of the plurality of compartments. The substance detection system comprises gas detector configured for detecting a presence of the one or more tracer substances within a volume of air, an air sampling system configured for sequentially sampling and transporting air from the compartments to the gas detector such that the gas detector is sequentially exposed with sampled air originating from different compartments of the plurality of compartments, and a control system coupled to the gas detector and configured for: i) receiving a detection signal from the gas detector, ii) signalling a presence of a first tracer substance in one of the plurality of compartments and iii) identifying in what compartment of the plurality of compartments the first tracer substance is detected.

Advantageously, by sequentially sampling air samples from different compartments the same gas detector can be used for a plurality of compartments, which is a major advantage in view of the generally expensive gas detectors for detecting one or more tracer substances.

Advantageously, by using an air sampling system coupled with a gas detector for detecting a tracer substance, a potentially dangerous tracer substance present in one of the compartments can efficiently be detected and an alarm signal be generated.

Advantageously, with the storage device according to the present disclosure, a non-invasive screening of objects stored in a compartment is provided. Hence, there is no need for each person using the storage device to individually have his objects screened to be stored in a compartment, before being authorised to use the storage device.

In embodiments, the air sampling system comprises one or more pumps configured for pumping air from the compartments to the gas detector.

In embodiments, the air sampling system is configured such that when sequentially sampling and transporting air from the plurality of compartments to the gas detector, a flow of sampled air is generated that is flowing from a gas input to a gas output of the gas detector. In this way, a fast detector response is obtained.

In embodiments, the air sampling system comprises a plurality of air transportation tubes connecting the compartments with the gas detector, and a valve system configured coupled with the plurality of air transportation tubes and wherein the valve system comprises valves configured for selectively enabling and disabling air transportation between the compartments and the gas detector.

Advantageously, by using a sampling system comprising transportation tubes and a valve system, the number of required gas detectors for monitoring all the compartments can be limited.

In embodiments, the air sampling system comprises a bypass configured for bypassing the gas input of the gas detector. In embodiments, the bypass comprises a bypass tube portion.

In embodiments, the air sampling system is configured such that a first portion of sampled air from the compartments is entering the gas input of the gas detector and a second portion of sampled air from the compartments is entering an input of the bypass.

Advantageously, by using a bypass, the flush time, i.e. the time to transport air from a compartment to the gas detector, can be reduced and hence the response time for detecting a tracer substance is increased.

In embodiments a pump is coupled to the output of the bypass.

In embodiments, the air sampling system is configured such that a first flow of sampled air is entering the gas input of the gas detector and a second flow of sampled air is entering an input of the bypass. Preferably a flow rate of the first flow is lower than a flow rate of the second flow.

In embodiments, the control system comprises a valve controller for controlling the valves and wherein the control system is further configured for synchronising operation of the valves with operation of the gas detector such that the gas detector is sequentially exposed with sampled air originating from different compartments.

In embodiments, the storage device is a locker device.

SHORT DESCRIPTION OF THE DRAWINGS

Figure 2:
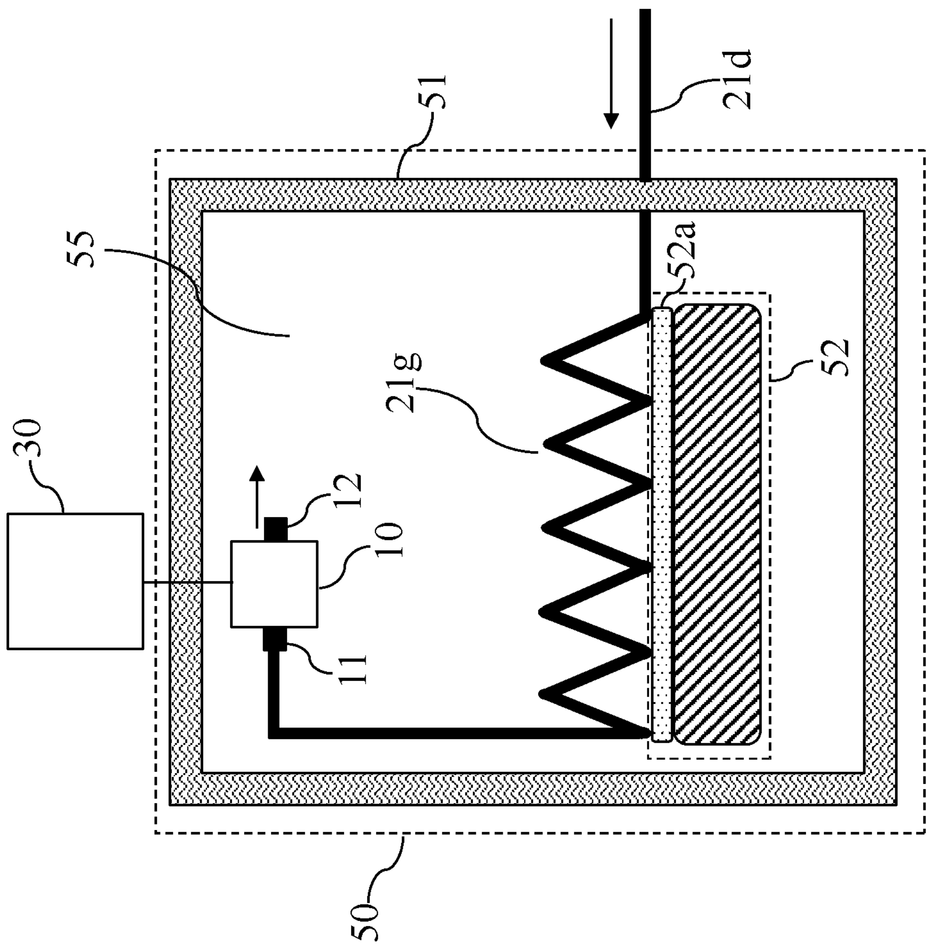
Figure 3:
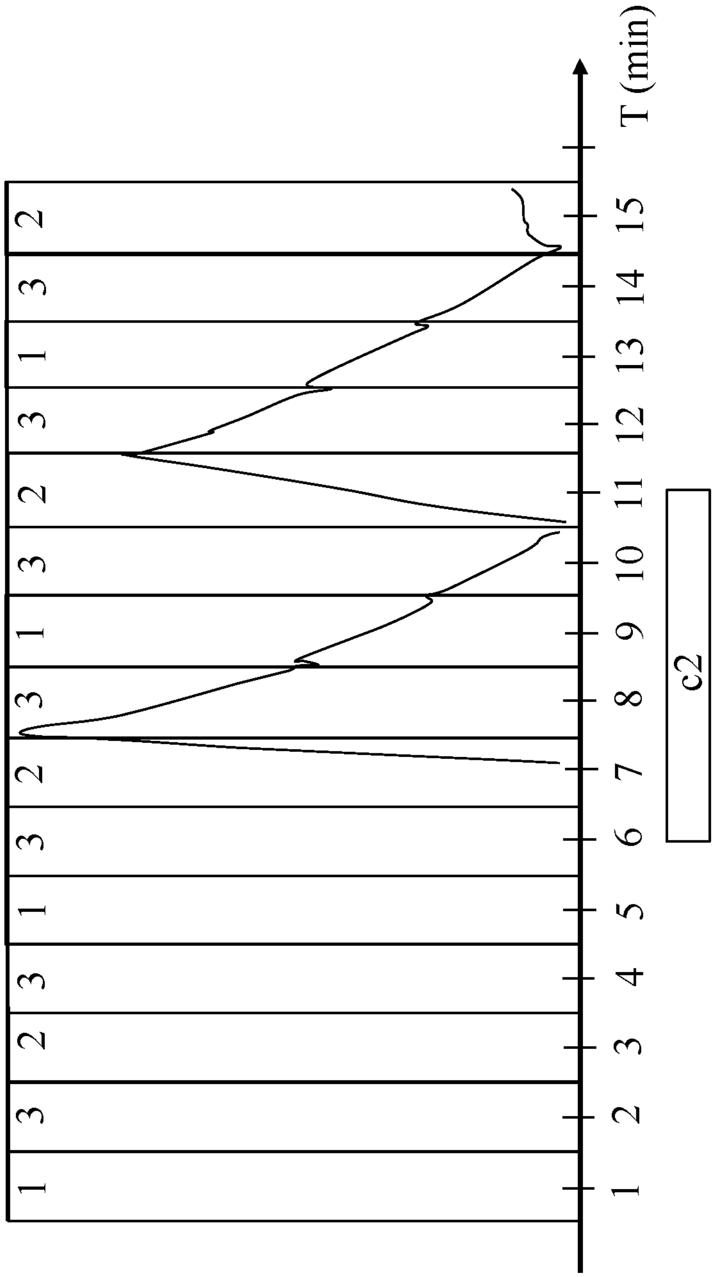

These and further aspects of the present disclosure will be explained in greater detail by way of example and with reference to the accompanying drawings in which:

FIG. 1 schematically illustrates an example of a storage device according to the present disclosure comprising a compartment assembly having three compartments, FIG. 2 schematically illustrates an example of a climate box comprising a sensor, FIG. 3 illustrates an example of a response curve for a system wherein a tracer substance is placed in one out of three compartments.

Figure 4:
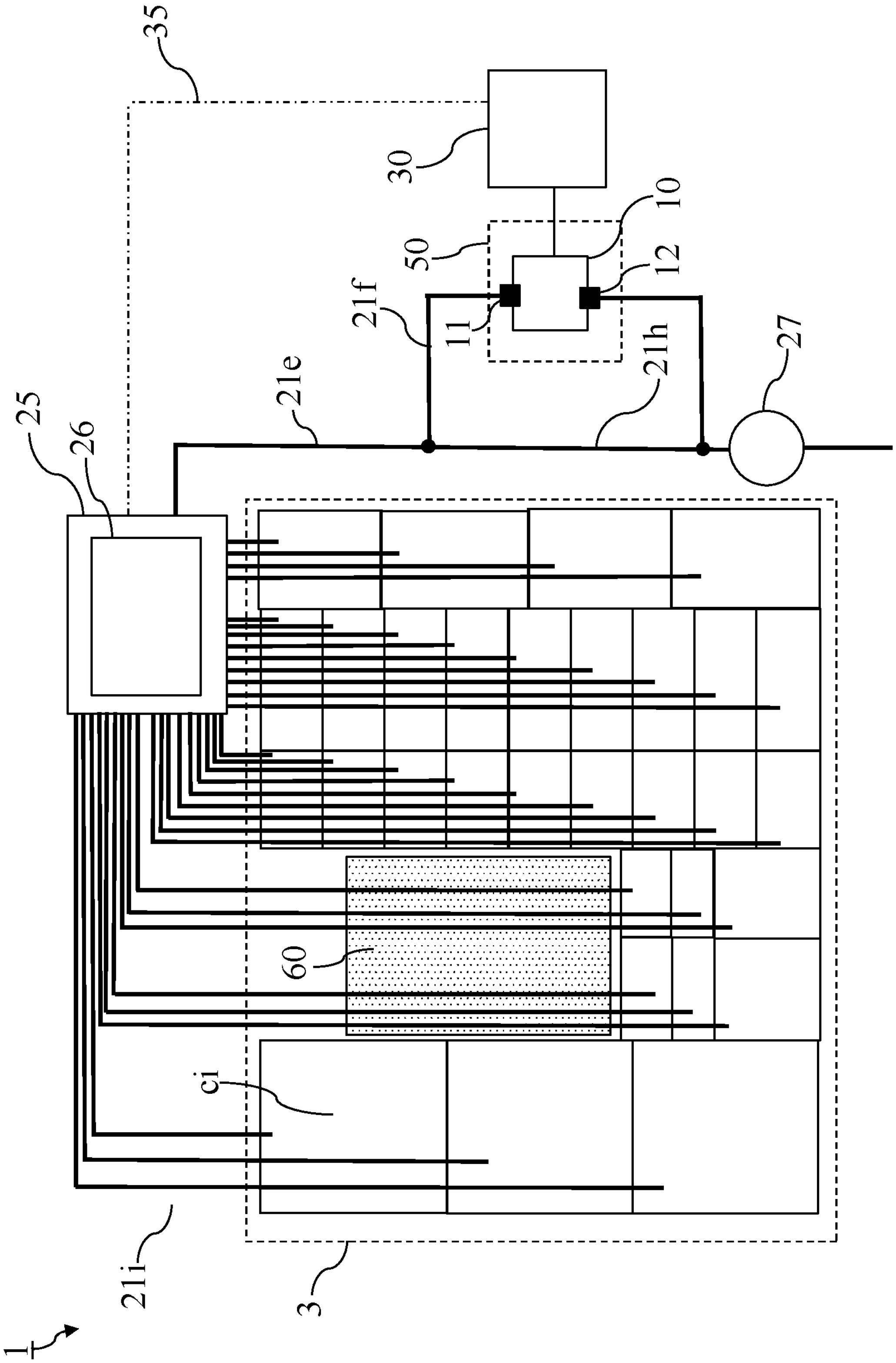
Figure 5:
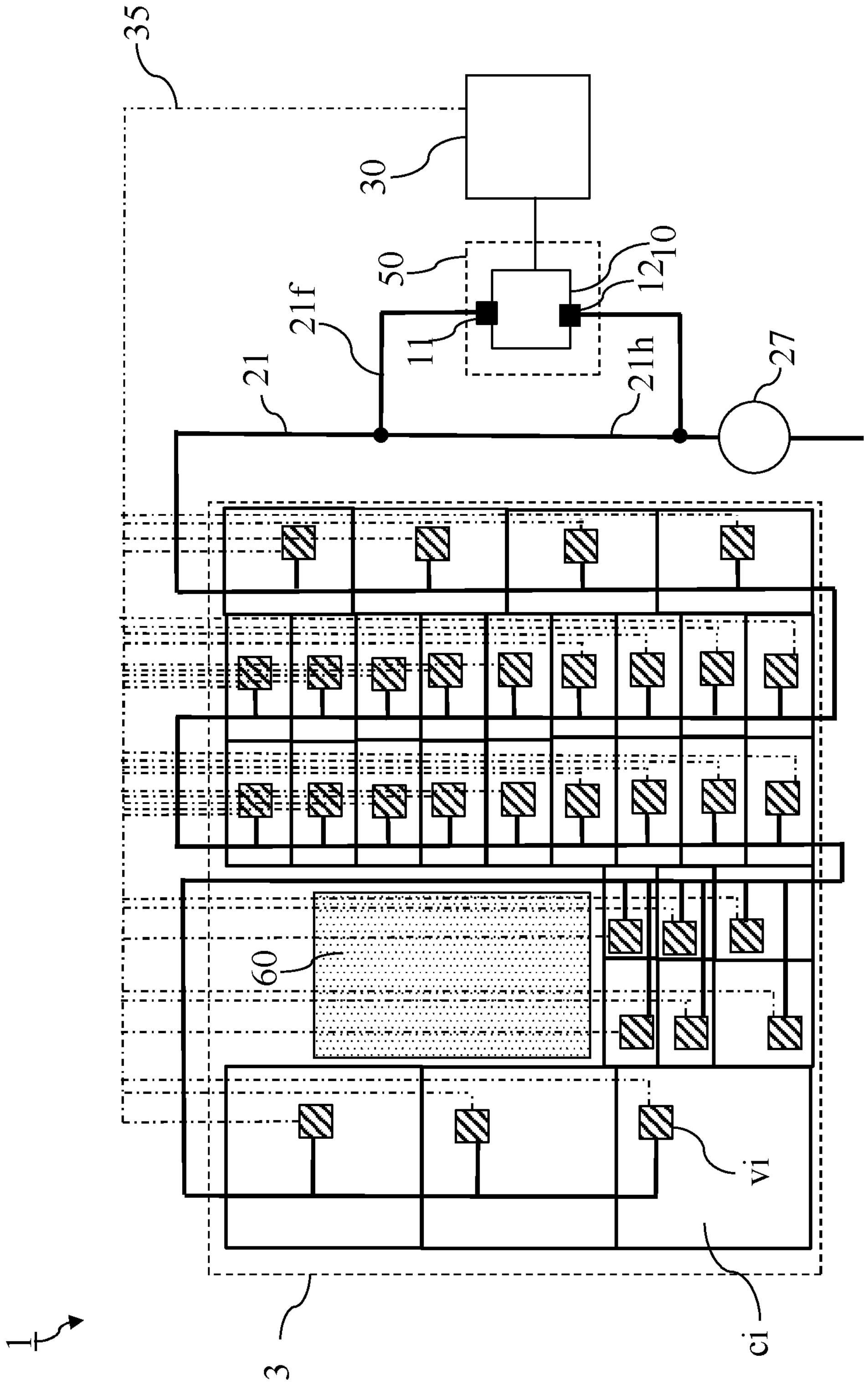
Figure 6:
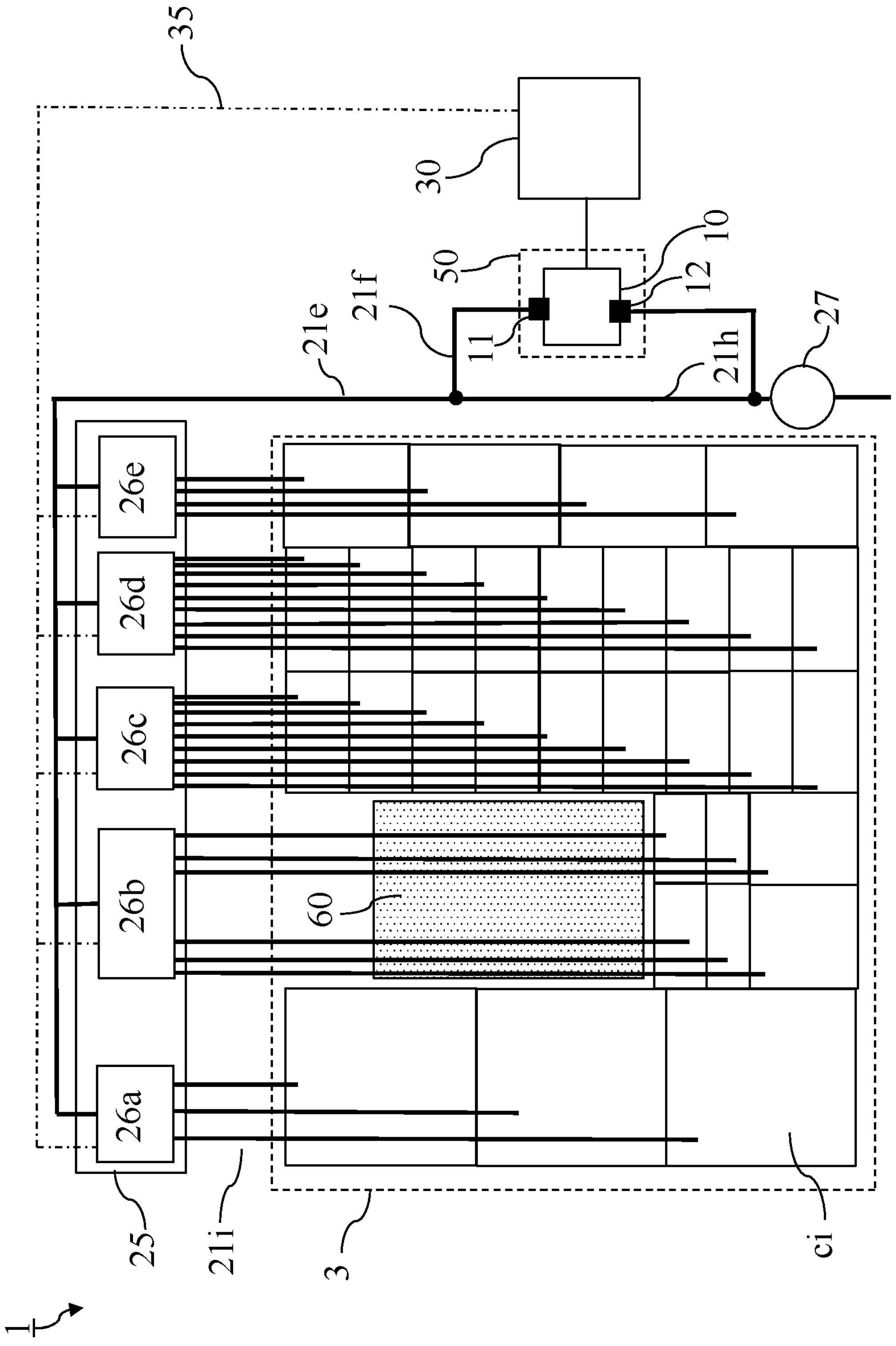
Figure 7:
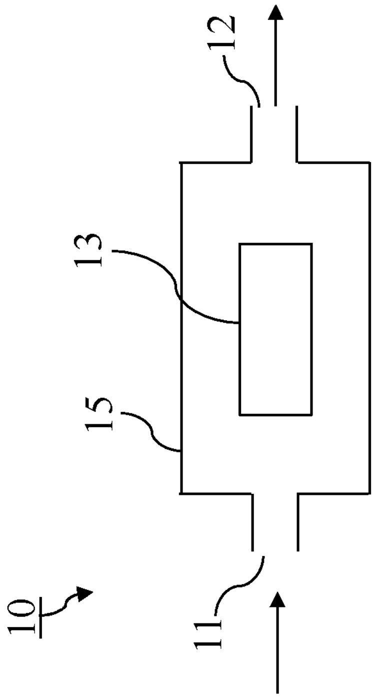

FIG. 4 schematically illustrates an example of a storage device according to the present disclosure having thirty-one compartments and wherein all valves of the valve system are centralized into a single valve island, FIG. 5 schematically illustrates an example of a storage device according to the present disclosure having thirty-one compartments and wherein the valves of the valve system are distributed and wherein a valve is integrated in each of the compartments, FIG. 6 schematically illustrates an example of a storage device according to the present disclosure having thirty-one compartments and wherein the valves of the valve system are grouped into multiple valve islands, FIG. 7 schematically illustrates a gas detector comprising a gas sensor enclosed in a housing of the gas detector.

The drawings of the figures are neither drawn to scale nor proportioned. Generally, identical components are denoted by the same reference numerals in the figures.

DETAILED DESCRIPTION OF EMBODIMENTS

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one ordinary skill in the art from this disclosure, in one or more embodiments.

The term "explosives" as used in the present application is a general term encompassing explosive compounds, explosive by-products, and explosive precursors.

Storage Device, General

An example of an embodiment of a storage device according to the present disclosure is schematically illustrated on FIG. 1. The storage device 1 comprises a compartment assembly 3 having a plurality of compartments c1, c2, c3. Each of the plurality of compartments has an access door d1, d2, d3 for placing one or more objects in the compartment. In the schematic representation of FIG. 1, only three compartments are shown, in practice the number of compartments is generally much larger. In embodiments, the number of compartments can range from tens to hundreds of compartments.

In embodiments, the access door is a lockable door, for example for embodiments wherein the storage device is locker device the door can be locked with a key or be electronically locked.

The storage device according to the present disclosure comprises a substance detection system 5 configured for detecting a presence of one or more tracer substances in one or more of the plurality of compartments.

A tracer substance has to be construed as a specific substance that is generally not present in ambient air. A tracer substance can be in the form of a vapor or in the form of a particulate.

In embodiments, the tracer substance to be detected is a vapor emanating from or particulates associated to an explosive. In other embodiments, the tracer substance to be detected is a vapor emanating from or particulates associated to a narcotic.

The substance detection system 5 comprises a gas detector 10 and an air sampling system 20 configured for sequentially sampling and transporting air from each of the compartments to the gas detector and a control system 30 coupled to the gas detector 10. By sequentially sampling, sampled air of only one compartment at a time is exposed to the gas detector. Typically, the gas detector 10 comprises a gas input 11 for receiving the air and a gas output 12 for outputting the air.

The control system 30 is to be construed as a system comprising one or more computers. The control system is configured for: i) receiving a detection signal from the gas detector, ii) signalling a presence of a first tracer substance in one of the plurality of compartments and iii) identifying in what compartment of the plurality of compartments the first tracer substance is detected.

As illustrated on FIG. 1, the air sampling system 20 comprises a valve system 25 configured for sampling air from the compartments and a plurality of air transportation tubes 21*a*, 21*b*, 21*c*, 21*d* connecting the compartments c1, c2, c3 with the gas detector 10. The valve system 25 comprises valves v1, v2, v3 configured for enabling and disabling air transportation between the compartments and the gas detector. In this way, by adequately setting the valves to an open or closed position, air can be sampled from a specific compartment. In the example shown in FIG. 1, by for example closing valves v1 and v2 and opening valve v3, air from the compartment c3 can be sampled and transported to the gas detector 10. In this example, a first set of tubes

21*a*, 21*b*, 21*c* are connecting each of the compartments with the valve system 25 and a further tube 21*d* is configured for further transporting the sampled air from the valve system to an air input of the gas detector 10.

The tubes of the air sampling system 20 can for example be plastic tubes. In embodiments, the tubes for transporting air have a diameter of for example 6 mm. In other embodiments, as discussed below in more detail, the last tube section connected to the input of the sensor is a copper pipe.

In embodiments of a storage device 1, as illustrated on FIG. 4 to FIG. 6, the air sampling system 20 comprises one or more pumps 27 configured for pumping air from the compartments to the gas detector. The pump is for example a diaphragm pump. In some embodiments, an internal pump is integrated in the gas detector. In other embodiments both an internal pump of the gas detector and a further additional external pump is used. The pump speed required depends on the size of the compartments and on the length of the tubes connecting the compartments with the sensor. The pump speed can typically be in a range between a few hundred of millilitre per minute to a few litres per minute.

As illustrated on FIG. 4 to FIG. 6, the air sampling system is configured for generating a flow of sampled air flowing from a gas input 11 to a gas output 12 of the gas detector when sequentially sampling and transporting air from the plurality of compartments to the gas detector. Indeed, as shown on FIG. 4 to FIG. 6, a pump 27, which can also be named main pump, is located downstream from the gas output 12 of the gas detector such that sampled air is pumped from the gas input to the gas output of the gas detector. Downstream is defined with respect to the flow direction of the air in the gas detector, i.e. from the gas input 11 to the gas output 12.

In other words, the air sampling system 20 of the storage device according to the present disclosure is configured such that when the valve system is selectively enabling air transportation from a first compartment to the gas detector, sampled air is flowing from the first compartment to a gas input 11 of the gas detector and further flowing from the gas input 11 to a gas output 12 of the gas detector. In this way, a continuous flow of sampled air is generated from the first compartment to the gas output 12 of the gas detector. Generally, when air transportation is enabled from the first compartment to the gas detector, air transportation from the other remaining compartments to the gas detector is disabled.

Advantageously, by generating a continuous flow of air from the compartment to the detector and further from the input to the output of the gas detector, the response time of the detector for sensing a tracer substance is fast and only depends on the transport time to transport the air from the compartment to the gas input of the gas detector. Indeed, as soon as sampled air from a compartment reaches the input of the gas detector, the gas sensor of the gas detector is exposed to the sampled air.

In embodiments the valves are electrically controlled valves, e.g. solenoid valves, and in other embodiments, the valves are pneumatically controlled valves.

Generally, the control system comprises a valve controller for controlling the valves v1, v2, v3. In embodiments, control system comprises multiple computers linked together. In embodiments, the valve controller is a commercially available Programmable Logic Controller, PLC. The PLC typically comprises an array of relays to control the valves.

In embodiments, the control system 30 is configured for synchronising operation of the valves with operation of the gas detector such that the gas detector 10 is sequentially receiving sampled air originating from different compartments c1, c2, c3.

The sampling period, also named sampling time, is generally in a range of a few seconds to a few minutes, for example a sampling period of one minute. The sampling time for each of the compartments are typically programmed. In embodiments, the sampling time can be different from one compartment to the other.

The sampling period has to be construed as the total time required for performing a detection of a potential presence of one or more tracer substances in a compartment. Hence the sampling period also includes the time necessary to transport air from the compartment to the detector. This transportation time is also named flushing time.

In embodiments, the air sampling system is configured for sampling air from anyone of the compartments within a sampling period that is equal or smaller than 2 minutes, preferably equal or smaller than one minute.

For example, if the sampling period is one minute, the air sampling system is switching the valves settings every minute in order to select another compartment every minute for detection of a potential tracer substance in a newly selected compartment.

During the sampling period, the gas detector is operational for detecting one or more tracer substance in the sampled air volume received from the selected compartment. Thereafter, the air sampling system switches the air supply for supplying a new sampled air volume from another selected compartment.

In embodiments, the sampling system comprises a bypass configured for bypassing the gas input of the gas detector. In this way, a portion of sampled air from the compartments is not entering the gas input of the gas detector. Generally, the air sampling system 20 is configured such that a first flow of sampled air is entering the gas input of the gas detector and a second flow of sampled air is entering an input of the bypass. The use of such a bypass allows to optimize the sampling period, more specifically the flushing time for transporting air from a compartment to the gas detector can be optimized.

Examples of storage devices 1 comprising a bypass are illustrated on FIG. 4 to FIG. 6. The bypass comprises an input for receiving air and an output for outputting air. In these embodiments, the bypass comprises a bypass tube portion 21*h* positioned in parallel with the gas detector such that a first portion of sampled air is entering the gas input 11 of the gas detector and a second portion of sampled air is entering the input of the bypass, e.g. entering the bypass tube portion 21*h*. As illustrated on FIG. 4 to FIG. 6, a pump 27 is coupled to an output of the bypass. This pump coupled to the output of the bypass can be selected to be a pump with a high pump speed such that the time to pump air from a compartment to the input of the gas detector can be strongly reduced. If no bypass is used, the pump speed at the entrance of the gas detector is generally small due to the limited air conductance through the detector and hence the transportation time from a compartment to the input of the gas detector will be longer when compared to a device using a bypass.

In embodiments, a first flow rate of the first flow of sampled air is lower than a second flow rate of the second flow of sampled air, preferably the first flow rate is two times lower, more preferably three times lower. More detailed embodiments of a bypass and corresponding flushing times are discussed below.

In embodiments, the storage device is a locker device comprising a compartment assembly having a plurality of locker compartments. In other embodiments, the storage device is a garbage bin device comprising a compartment assembly having a plurality of garbage compartments.

Gas Detector for Detecting Tracer Substances

The gas detector 10 for detecting tracer substances is a detector comprising sensors configured for detecting one or more specific tracer substances within a volume of air or an air flow. Such a sensor of the gas detector can be construed as a chemical sensor.

A gas detector 10, as schematically illustrated on FIG. 7, typically comprises a housing 15 enclosing one or more gas sensors 13. The gas input 11 and the gas output 12 of the gas detector correspond to respectively an entrance opening and an exit opening of the housing 15. The arrows on FIG. 7 schematically illustrate a flow direction of sampled air entering the gas detector 10 and sampled air exiting the gas detector 10.

An example of such a chemical sensor is disclosed in EP2758772B. The sensor described in this patent document comprises an array of electrode pairs on a substrate, and wherein organic nanofibers are deposited on the electrode pairs. The organic nanofibers are responsive to a specific tracer substance associated to specific material such as explosives or narcotics. These tracer substances can be present in the air in the form of a vapor emanating from or particulates associated to explosives or in the form of a vapor emanating from or particulates associated to narcotics. By providing detection zones having a different nanofiber material, different types of substances can be detected. Indeed, the different nanofibers vary their electrical conductivity upon exposure to specific substances and, as a result, substances can selectively be detected.

In EP2758772B a sensor having nanofibers configured to detect substances associated to an explosive compound is disclosed, and the explosive compound is selectable from the group consisting of: trinitrotoluene (TNT); dinitrotoluene (DNT); 2,3-dimethyl-2,3-dinitrobutane (DMNB); 1,3,5-trinitroperhydro-1,3,5-triazine (RDX); pentaerythritol tetranitrate (PETN); Octahydro-1,3,5,7-tetranitro-1,3,5,7-tetrazocine (HMX); nitromethane; nitroglycerin; nitrocellulose; ethylene glycol dinitrate; dimethyl methylphosphonate; ammonium nitrate, urea nitrate; acetone peroxides; triacetone triperoxide (TATP); peroxyacetone; tri-cyclic acetone peroxide (TCAP); diacetone diperoxide (DADP); hexamethylene triperoxide diamine (HMTD); and composites or combinations thereof.

These types of sensors are very sensitive for detecting the substance within a volume of air, in embodiments, the sensor can detect the substance in a concentration as low as 1 ppm. In other embodiments, the sensor can detect the substance in a concentration as low as 1 ppb.

The sensors of the gas detector according to the present disclosure for detecting a substance in an air volume or air flow are not limited to the sensor disclosed in EP275877B. In literature, multiple examples of gas sensors are disclosed that are suitable for detecting tracer substances, more specifically detecting tracer substances associated to explosives or narcotics.

In embodiments, the sensor of the gas detector according to the present disclosure can be configured for selectively detecting one type of tracer substance, such as for example TATP, whereas in other embodiments the sensor can be configured to detect multiple different tracer substances.

In embodiments, the gas detector comprises for example sixteen different nanofibers which generate sixteen different output signals when exposed to different substances.

In embodiments, a gas detector configured for detecting tracer substances can be construed as a multi-pixel sensor comprising multiple pixels wherein each pixel has an electrode pair covered with a sensing material. In embodiments, the multi-pixel detector comprises at least a first pixel or a first pixel group for detecting the first tracer substance and a second pixel or a second pixel group for detecting a second tracer substance different from the first tracer substance.

Sensor Conditioning and Climate Box

Safe assemblies according to the present disclosure are to be used either indoor or outdoor. Therefore, especially for a storage device for outdoor use, the gas detector should be robust for what concerns variations of environmental conditions such as for example variations in temperature, variations in humidity and the presence of air pollution. Both variations of the temperature of the sampled air as well as variations of the temperature of the sensor of the gas detector itself, can influence the operational performances of the gas detector. The inventors have tested various detectors and concluded that preferably, the humidity of the sampled air should be constant within one percent and the temperature should be constant within one degree.

In embodiments, the storage device optionally comprises a climate box having insulating walls forming a cavity and the gas detector is placed inside the cavity of the climate box. The climate box limits too large variations of the temperature of the sensor of the gas detector, especially for outdoor placed safe assemblies where large temperature variations can occur for example due to day and night transitions. In embodiments, the climate box comprises a heating device, e.g. an electrical heating element, for maintaining a constant temperature in the cavity of the climate box.

An exemplary embodiment of a climate box 50 is schematically shown on FIG. 2. The sensor 10 is placed inside the cavity 55 of the climate box 50. The insulating walls 51 are made of an insulating material such as for example expanded polystyrene. A heating device 52 is maintaining a constant temperature within the cavity of the climate box or is maintaining the temperature within a temperature range. A reference temperature for the climate box is for example a temperature between 15° and 45°, depending on the outdoor conditions. The temperature within the cavity is then maintained to be equal to the reference temperature within 3°, preferably within 2°, more preferably within 1°. For example, the temperature inside the climate box can be kept at a reference temperature of 30° within 1°. In embodiments, temperature and/or humidity sensors are placed inside the cavity of the climate box to monitor the temperature and/or humidity.

In embodiments, as illustrated on FIG. 2, the heating device is further configured for heating a tube portion between the valve system and the gas detector. The tube portion that is heatable with the heating device, also named heat pipe, is connected on one side to the air input of the sensor and on the other side connected to the tube that is connected to the valves, i.e. air coming from one of the compartments, as indicated with an arrow on FIG. 2, is flowing through the heated tube portion before reaching the sensor. In this way, the sampled air is heated before reaching the gas detector and the temperature of the sampled air can be controlled and fluctuations of the temperature of the sensor are further reduced. The heating of the air samples also reduces condensation on the sensor and the influence of the humidity on the sensor is reduced. Preferably the heated tube portion is a copper tube portion to facilitate the heating of the tube portion.

In embodiments, as shown on FIG. 2, the heating device 52 for heating the tube portion is the same heating device as used for maintaining a constant temperature within the cavity 55 of the climate box. In FIG. 2, the heating device is an electrical heater heating up a heat plate 52*a* that is at the same time heating the interior of the climate box and heating the copper tube portion that is in contact with the heat plate 52*a*. In other embodiments, the heating device for heating the heating tube and the heating device for maintaining a constant temperature within the cavity of the climate box are two distinct heating devices.

In the embodiments shown on FIG. 2, tube portion 21*g* that is heatable with the heating device 52 is a spiral or zig-zag tube portion configured such that the trajectory of the air flowing through the heat pipe becomes longer.

In embodiments, the air outlet of the sensor is freely flowing into the cavity of the climate box, as schematically illustrated on FIG. 2. In other embodiments, the air outlet of the sensor is connected to an outlet tube for transporting the monitored air outside the climate box.

Control System

In embodiments the control system is comprises one or more computers, wherein at least one computer is coupled to the sensor with for example a USB cable.

The control system comprises one or more computer-readable storage media comprising one or more computer programs The computer programs generally comprise a number of algorithms to control the valves and to control the detector.

A first algorithm is configured for acquiring and storing detection signals from the gas detector. Typically, the controller comprises a memory card for storing the detection data.

As discussed above, the gas detector 10 is sequentially exposed with sampled air originating from different compartments. Therefore, the first algorithm comprises steps for performing the acquisition of the detection signals of the gas detector in synchrony with the operation of the valves, wherein the valve settings define a selected compartment, as identified by for example a safe reference number. In this way a relation is established between the detection signals received and the compartment having provided the air sample for detection. The acquisition of the detection data from the various compartments is performed at a rate corresponding to the inverse of the air sampling period.

A second algorithm of the controller is configured for analysing the detection signals received from the sensor.

In embodiments, the detection signals are compared with predefined reference signals wherein each reference signal corresponds to a detection of a substance associated to for example an explosive or a narcotic. The predefined reference signals are stored in a library and correspond to data that are recorded during a calibration phase of the safe system. If a match between a detected signal and a reference signal is found, the second algorithm comprises a step of signalling the detection of the substance and signalling the reference number of the compartment where the substance is detected. The signalling can be in the form of an auditive and/or visual alarm at the compartment, a transfer of a text message to a cellular phone of a security agent, a transfer of an alarm signal to a central monitoring station or any other suitable signalling means.

In embodiments, as discussed above, the gas detector is a multi-pixel sensor comprising multiple pixels and wherein each pixel or wherein groups of pixels are covered with a different sensing material such that the sensitivity for detecting a specific substance or a specific gas is different from pixel to pixel or from pixel group to pixel group. In embodiments, a reference dataset is typically generated wherein for example the specific tracer substance to be detected together with background gasses is measured with the gas detector using a test set-up.

The reference data set is stored in one of the one or more computer-readable storage media of the control system.

In embodiments, when actual data are taken with the gas detector of the storage device, the control system uses a so-called fingerprinting algorithm that, when executed, compares the actual detection signals obtained with the gas detector with the reference data set and signals when a match is found between the actual detection signals and reference data of the reference data set that are indicative for the presence of the specific tracer substance to be detected.

In embodiments, an empty and closed reference compartment is used for performing a background measurement. The background detection signal obtained from the reference compartment is then subtracted from the detection signals obtained from the other compartments before performing the comparison with the predefined reference signals.

In embodiments, the control system comprises a sequence algorithm to define an order for monitoring the various compartments of the storage device.

In embodiments, a random order is followed for sampling air from the various compartments, while in other embodiments, a fixed pre-defined order is followed.

In embodiments, the compartments comprise a door status detector to monitor if the door is open or closed and the control system is receiving the door status information of the compartments.

In embodiments, the sequence algorithm is defining the sequence of the compartments to be monitored based, at least partly, on the door status information received. In embodiments, a compartment having its door status switching status from open to closed, is prioritized for being monitored in favour of compartments having been closed for a longer period of time and which already have been monitored for the presence of substances.

In FIG. 3, an example of a response curve as function of time, expressed in minutes, is shown to illustrate the detection principle. In this example, two compartments numbered 1 and 2 are monitored for the presence of a substance and a third compartment numbered 3 is used for a background measurement. The third compartment is empty and remains closed. In FIG. 3, the sampling rate is one minute, i.e. every minute valves are switched to sequentially transfer air from one of the three compartments to the sensor. The numbers on top of FIG. 3 indicate the sequence of monitoring the three compartments. In between a monitoring of compartment one and two, a background detection is done in compartment number three. At minute 6, a tracer substance, in this example ammonia, is placed in compartment number 2 and the substance is removed from compartment number 2 after five minutes, the rectangle below the time axis indicates the period the tracer substance is present in compartment number two c2. The sampling time is in this example is one minute. As shown on FIG. 3, at minute 6, the sensor was still detecting background in compartment number three. Thereafter, after switching to a monitoring of compartment number two, a signal of the tracer substance is detected. One minute later when switching again to the background detection of compartment number three, the signal drops, and when thereafter switching to compartment number one, the signal is further dropping. At minute 11, when detecting again air form the second compartment, the signal of the substance is again predominantly present. At minute 15, when again detecting air from the second compartment, no tracer substance is detected anymore as the tracer substance was removed from compartment number two after five minutes. As illustrated, in this example there is a maximum delay of about two minutes for detecting a tracer substance placed in a compartment. This delay time depends on the sequence defined for monitoring the compartments and on the number of compartments being monitored by the same sensor. In embodiments, the background detection is only performed after a given time period has lapsed.

Storage Devices with Multiple Gas Detectors

As discussed above, the storage device can comprise tens to hundreds of compartments. Generally, the number of compartments that are monitored with one sensor is limited to a given maximum number. This maximum number depends on the required sampling rate and associated response time required. The more compartments that are monitored with the same gas detector, the longer becomes the tube lengths connecting the compartment with the gas detector, and hence the longer becomes the response time. If there are more compartments than the maximum number of compartments that can be monitored with a single gas detector, then multiple gas detector units are used. Each gas detector unit is to be construed as an individually operating gas detector.

In embodiments, the storage device comprises a first and a second gas detector unit, and wherein the air sampling system comprises a first set and a second set of air transportation tubes respectively connecting a first group and a second group of compartments with the first and second gas detector unit. In these embodiments, the valve system comprising a first valve unit and a second valve unit, wherein the first valve unit comprises a first set of valves configured for enabling and disabling gas transportation between the first group of compartments and the first gas detector unit and the second valve unit comprises a second set of valves configured for enabling and disabling gas transportation between the second group of compartments and the second gas detector unit.

In embodiments, the first and second gas detector unit are coupled to the same control system. In other embodiments, the first and second gas detector unit are coupled to respectively a first and a second control system.

In embodiments, the first and second gas detector unit are enclosed in respectively a first and a second climate box.

The person skilled in the art can generalize the storage device from using two gas detector units as discussed above to any other number of gas detector units.

Air Sampling System, Configurations

The configuration of the air sampling system can be different from one embodiment to another embodiment in terms of for example air tube configurations and valve configurations.

Generally, the sampling system comprises a common air transportation tube 21*d,* 21*e,* 21 and a plurality of primary air transportation tubes 21*a,* 21*b,* 21*c,* 21*i.* Each of the primary air transportation tubes has a first end and a second end, and wherein the first end of each of the primary air transportation tubes is fluidly coupled to one of the compartments and wherein the second end of each of the primary air transportation tubes is fluidly coupled with the common air transportation tube 21*d,* 21*e,* 21. Further, the gas input 11 of the gas detector is fluidly coupled with the common air transportation tube.

Considering for example a first primary tube having a first end fluidly coupled with a first compartment. When sampling air from the first compartment, the sampled air enters the first end of the first primary air transportation tube and the sampled air is then further transported to the common air transportation tube and further from the common air transportation tube to the gas detector.

In these embodiments, one or more pumps 27 are configured such that when sequentially sampling and transporting air from the compartments to the detector, a flow of sampled air is generated that is flowing from the common air transportation tube to the gas input 11 and further flowing from the gas input 11 to the gas output 12 of the gas detector. Hence, a continuous flow of sampled air is generated between the common air transportation tube and the gas output of the detector.

With reference to FIG. 4, FIG. 5 and FIG. 6, three examples are shown of a storage device 1 comprising a compartment assembly 3 having thirty-one compartments ci, with i=1 to 31, and wherein a different type of air sampling system is used. In the figures, the compartments ci are illustrated with rectangular boxes. The number of compartments is arbitrary chosen for illustrative purposes only. As mentioned above, the compartment assembly can comprise any number of compartments, e.g. tens to hundreds of compartments.

With reference to FIG. 4, an example of an embodiment of a storage device is shown wherein all valves of the valve system 25 are centralized into a single valve island 26. By definition, a valve island is a combination of valves grouped together in the same location. Hence a valve island comprises a plurality of valves. A valve island can also be named valve module.

Generally, the valve island comprises a plurality of valves wherein each valve of the valve island has a valve input side and a valve output side. The valve island generally also comprises a plurality of gas entrances and a single gas exit, and wherein each of the gas entrances is coupled to the valve input side of one of the plurality of valves of the valve island and wherein the valve output side of each of the plurality of valves is coupled to the single gas exit of the valve island.

Generally, the valves of the valve island use a common valve control line 35. Hence with this configuration the number of required cables between the valve island and the control system 30 is limited. In embodiments, the valve island 26 can be located outside the compartment assembly 3 or in other embodiments it can be placed in a dedicated technical compartment 60 of the compartment assembly.

On FIG. 4, a technical compartment 60 is schematically illustrated as a dotted surface. In embodiments, the control system or part of the control system of the storage device can for example be placed in the technical compartment 60.

In the embodiment shown on FIG. 4, an air transport tube 21*i* is provided running from each compartment to the valve island 26. As, in this example, there are thirty-one compartments, there are also thirty-one air transport tubes 21*i* for making the connections between the compartments and the centralized valve island 26. In the embodiment shown on FIG. 4, a common air transport tube 21*e* is connected to an output of the valve island 26 and an external pump 27 is configured for pumping air from a compartment as selected through the settings of the valves of the valve island.

In this embodiment, as illustrated on FIG. 4, a bypass tube portion 21*h* is bypassing the gas detector 10. This bypass tube portion 21*h* is placed in parallel with the gas detector 10. The external pump 27 is coupled to an end portion of the bypass tube portion 21*h*. As shown on FIG. 4, an air transport tube 21*f* is connecting the transport tube 21*e* to the gas input 11 of the gas detector. Hence, a first portion of the air in the air transport tube 21*e* is being pumped towards the gas detector and a second portion is pumped through the bypass tube portion 21*h*. In this embodiment the gas detector has an internal pump having a flow rate that is much lower than the flow rate of the external pump 27. For example, the flow rate of the internal pump of the gas detector is 400 ml/minute while the flow rate of the pump 27 is for example 4 l/minute. In this way, by using the additional external pump 27 with a high flow rate in combination with the bypass tube portion 21*h*, the flush time, i.e. the time needed to flush the entire air connection tube from a compartment towards the gas detector is strongly reduced.

In other embodiments, no external pump 27 and no bypass tube portion is used and only the internal pump of the gas detector is used. In those embodiments the flush time is much longer.

In the table 1 below, the flush time expressed in seconds for a given tube length is calculated for different lengths of the air transportation tube and for a configuration using a pump of 400 ml/minute and a configuration wherein a pump of 4 l/minute is used.

TABLE 1 flush time as function of tube length

| Length of tube (m) | Flush time (s) with pump of 400 ml/minute | Flush time (s) with pump of 4 l/minute |
|---|---|---|
| 1 | 1.9 | 0.2 |
| 2 | 3.8 | 0.4 |
| 4 | 7.5 | 0.8 |
| 6 | 11.3 | 1.1 |
| 8 | 15.1 | 1.5 |
| 10 | 18.8 | 1.9 |

The flush time is the time required to transport an air sample from the compartment to the gas detector and hence can be considered as a delay time before the gas detector receives the sampled air and can detect a tracer substance. The internal diameter of the air transport tubes taken for this calculation is 4 mm. As illustrated, for a tube length of 10 meter, the flush time with a pump of 400 ml/minute is 18.8 seconds, which is strongly reduced to 1.9 seconds if a pump of 4 l/minute is used. What pump to use will depend on the number of compartments and the length of the air transportation tubes and the response time required for detecting a tracer gas.

In FIG. 5, an example of an embodiment of a storage device having a compartment assembly with thirty-one compartments is shown and wherein the valves of the valve system are distributed, i.e. the valves are located near or inside the compartments. In this embodiment, a valve is integrated in each of the compartments. In FIG. 5, the valves vi are identified with a square box that is diagonally striped. All the valves vi are coupled to a main common air transport tube 21 as illustrated on FIG. 5. From each compartment starts a primary air transportation tube that is fluidly coupled to the main common air transportation tube 21 Also in this example, as shown on FIG. 5, a bypass tube portion 21*h* is placed in parallel with the gas detector. The advantage with this air sampling system configuration is that less air transportation tubes are required when compared to the air sampling system shown in FIG. 4. On the other hand, the length of valve control lines 35 is longer as the control lines have to be connected to each of the distributed valves vi.

In FIG. 6, a further example of an embodiment is shown of a storage device having a compartment assembly 3 having thirty-one compartments ci and wherein the valves of the valve system are grouped into multiple valve islands. In the example shown on FIG. 6, there are five valve islands 26*a*, 26*b*, 26*c*, 26*d* and 26*e* forming the valve system 25. In this embodiment, the valve islands are located on top of the compartment assembly 3. With this configuration a modular system is formed which allows to extend the system if for example the number of compartments increases. The number of valve control lines needed 35 with this embodiment shown on FIG. 6, when compared to the distributed valve configuration shown in FIG. 5, is strongly reduced.

The invention claimed is:

1. A storage device comprising a compartment assembly having a plurality of compartments, wherein each of the plurality of compartments has an access door for placing one or more objects in the compartment, wherein the storage device comprises a substance detection system configured for detecting a presence of one or more tracer substances in one or more of the plurality of compartments, the substance detection system comprising:

a gas detector configured for detecting a presence of the one or more tracer substances within a volume of air, the gas detector having a gas input for receiving air and a gas output for outputting air, an air sampling system configured for sequentially sampling and transporting air from the plurality of compartments to the gas detector such that the gas detector is sequentially exposed with sampled air originating from different compartments of the plurality of compartments, and a control system coupled to said gas detector and configured for:

i) receiving a detection signal from the gas detector, ii) signaling a presence of a first tracer substance in one of said plurality of compartments; and iii) identifying in what compartment of the plurality of compartments the first tracer substance is detected, wherein said air sampling system comprises:

one or more pumps configured for pumping air from the compartments to the gas detector;

a plurality of air transportation tubes connecting each of the plurality of compartments with the gas detector;

a valve system coupled with the plurality of air transportation tubes, wherein the valve system comprises valves configured for selectively enabling and disabling air transportation between each compartment and the gas detector, wherein the valves of the valve system are grouped for forming one or more valve islands, each valve island being a combination of valves grouped together in the same location, wherein said air sampling system comprises a bypass for bypassing said gas input of the gas detector, said bypass comprising a bypass tube portion, wherein said air sampling system is configured such that when sequentially sampling and transporting air, a first flow of sampled air is entering the gas input of the gas detector and a second flow of sampled air is entering an input of the bypass, wherein at least one of said one or more pumps is coupled to an output of the bypass, and wherein said air sampling system is configured such that a first flow rate of said first flow of sampled air is lower than a second flow rate of said second flow of sampled air.

2. The storage device according to claim 1, wherein said sampling system comprises a common air transportation tube and a plurality of primary air transportation tubes, and wherein each of the primary air transportation tubes has a first end and a second end, and wherein the first end of each of the primary air transportation tubes is fluidly coupled to one of the compartments, and wherein the second end of each of the primary air transportation tubes is fluidly coupled with the common air transportation tube, and wherein the gas input of the gas detector is fluidly coupled with the common air transportation tube, and wherein said one or more pumps are configured such that when sequentially sampling and transporting air from the compartments to the detector, a flow of sampled air is generated flowing from the common air transportation tube to the gas input of the gas detector and further flowing from the gas input to the gas output of the gas detector.

3. The storage device according to claim 1, wherein at least one of the pumps is located downstream from the gas output of the gas detector and/or wherein at least one of the pumps is an internal pump located inside the gas detector and configured for pumping air from the gas input to the gas output of the gas detector.

4. The storage device according to claim 1, wherein the gas detector comprises a gas input and a gas output, and wherein said air sampling system is configured such that when the valve system is selectively enabling air transportation from a first compartment to the gas detector, sampled air is flowing from the first compartment to the gas input of the gas detector and further flowing from the gas input to the gas output of the gas detector such that a continuous flow of sampled air is generated from the first compartment to the gas output of the gas detector.

5. The storage device according to claim 1, wherein the control system is further configured for synchronizing operation of the valves with operation of the gas detector such that the gas detector is sequentially exposed with sampled air originating from different compartments.

6. The storage device according to claim 1, wherein each valve island comprises:

a plurality of valves, each valve having a valve input side and a valve output side, a plurality of gas entrances and a single gas exit, and wherein each of the gas entrances is coupled to the valve input side of one of the plurality of valves and wherein the valve output side of each of the plurality of valves is coupled to the single gas exit.

7. The storage device according to claim 1, wherein said gas detector comprises a multi-pixel sensor comprising multiple pixels wherein each pixel has an electrode pair covered with a sensing material, said sensing material is an organic nanofiber.

8. The storage device according to claim 7, wherein said multi-pixel detector comprises at least a first pixel or a first pixel group for detecting the first tracer substance and a second pixel or a second pixel group for detecting a second tracer substance different from the first tracer substance.

9. The storage device according to claim 1, wherein said gas detector comprises a housing and one or more gas sensors, and wherein said housing is enclosing said one or more gas sensors and wherein said gas input and said gas output of the gas detector correspond to respectively an entrance opening and an exit opening of said housing.

10. The storage device according to claim 1, wherein said air sampling system is configured for heating sampled air before the sampled air reaches the gas detector.

11. The storage device according to claim 10, comprising a first heating device configured for heating a tube portion between the valve system and an air input of the gas detector, said tube portion is a copper tube portion.

12. The storage device according to claim 1, comprising a climate box configured to maintain a cavity of the climate box at a constant temperature or within a predefined temperature range, and wherein said gas detector is placed inside said cavity, the climate box comprises insulating walls forming the cavity.

13. The storage device according to claim 1, wherein said control system comprises one or more computer-readable storage media comprising a reference data set and a computer program, and wherein the computer program comprises an algorithm, when executed, to compare the detection signals acquired with the gas detector with said reference data and to signal a presence of the first tracer substance if a match is found between the detection signals acquired and reference data of the reference data set that are indicative of a presence of the tracer substance.

14. The storage device according to claim 1, wherein said control system is configured for signaling a presence of a second tracer substance different from the first tracer substance.

15. The storage device according to claim 1, wherein said air sampling system is configured such that the first flow rate is at least two times lower than the second flow rate.

16. The storage device according to claim 1, wherein said air sampling system is configured such that the first flow rate is at least three times lower than the second flow rate.

17. A storage device comprising a compartment assembly having a plurality of compartments, wherein each of the plurality of compartments has an access door for placing one or more objects in the compartment, wherein the storage device comprises a substance detection system configured for detecting a presence of one or more tracer substances in one or more of the plurality of compartments, the substance detection system comprising:

a gas detector configured for detecting a presence of the one or more tracer substances within a volume of air, the gas detector having a gas input for receiving air and a gas output for outputting air, an air sampling system configured for sequentially sampling and transporting air from the plurality of compartments to the gas detector such that the gas detector is sequentially exposed with sampled air originating from different compartments of the plurality of compartments, and a control system coupled to said gas detector and configured for:

i) receiving a detection signal from the gas detector, ii) signaling a presence of a first tracer substance in one of said plurality of compartments; and iii) identifying in what compartment of the plurality of compartments the first tracer substance is detected, wherein said air sampling system comprises:

one or more pumps configured for pumping air from the compartments to the gas detector;

a plurality of air transportation tubes connecting each of the plurality of compartments with the gas detector;

a valve system coupled with the plurality of air transportation tubes, wherein the valve system comprises valves configured for selectively enabling and disabling air transportation between each compartment and the gas detector, wherein the valves of the valve system are grouped for forming one or more valve islands, each valve island being a combination of valves grouped together in the same location, wherein the control system comprises a sequence algorithm configured for defining an order for monitoring the plurality of compartments with the gas detector, wherein said control system is configured for receiving a door status information from each of the compartments, and wherein said sequence algorithm comprises a step of prioritizing an order of a compartment having a door status being switched from open to closed.

* * * * *